CONTROLLABLE TELEVISION RASTER GENERATOR

Filed July 8, 1965

KLAUS J. HECKER
HANS STAEUDLE
WERNER G. HUEBER
*INVENTOR.*

BY J. M. St. Amand
*ATTORNEY*

CONTROLLABLE TELEVISION RASTER GENERATOR

Filed July 8, 1965 5 Sheets-Sheet 2

KLAUS J. HECKER
HANS STAEUDLE
WERNER G. HUEBER
INVENTORS

BY J. M. St. Amand
ATTORNEY

CONTROLLABLE TELEVISION RASTER GENERATOR

Filed July 8, 1965 5 Sheets-Sheet 3

KLAUS J. HECKER
HANS STAEUDLE
WERNER G. HUEBER
*INVENTORS*

BY J. M. St. Amand
ATTORNEY

CONTROLLABLE TELEVISION RASTER GENERATOR

Filed July 8, 1965 5 Sheets-Sheet 4

KLAUS J. HECKER
HANS STAEUDLE
WERNER G. HUEBER
*INVENTORS*

BY J. M. St. Amand

*ATTORNEY*

CONTROLLABLE TELEVISION RASTER GENERATOR

Filed July 8, 1965 5 Sheets-Sheet 5

KLAUS J. HECKER
HANS STAEUDLE
WERNER G. HUEBER
INVENTORS

BY J. M. St. Amand
ATTORNEY

United States Patent Office 3,379,833

Patented Apr. 23, 1968

3,379,833

CONTROLLABLE TELEVISION RASTER GENERATOR

Klaus J. Hecker, Oberursel, Taunus, and Hans Staeudle, Heidenheim-Schnaitheim, Germany, and Werner G. Hueber, Riverside, Calif., assignors to the United States of America as represented by the Secretary of the Navy Filed July 8, 1965, Ser. No. 470,649
4 Claims. (Cl. 178—7.7)

The invention herein described may be manufactured and used by or for the Government of the United States of America for governmental purposes without the payment of any royalties thereon or therefor.

The present invention relates to television and more particularly to a generator for providing fast electronic control of a television raster in size, shape, and position as a function of external signals.

All possible combinations of raster size, raster shape, and raster position may be generated with the high linearity of the deflection waveforms provided by the instant invention. This operation is especially useful for all correlation devices which make use of television like rasters.

The instant application is related to copending application Ser. No. 472,079, filed July 8, 1965, now Patent No. 3,315,032, for Low-Light-Level Imaging System by Klaus J. Hecker.

In prior methods the sawtooth for the raster was changed in size and position by gain control amplifiers. This operation exhibited a high non-linearity of the sawtooth waveforms and called for complex electronic circuitry. Raster roll was conventionally performed by a mechanical turning of the deflection yoke; this operation is slow and difficult to control accurately.

The generator of the instant invention allows fast electronic control of a television raster's size, shape and position as a function of external signals. The primary features of the instant device are: high linearity of the controllable deflection waveforms which produce the raster changes; simplicity of producing all combinations of the different raster changes; and the high speed with which these changes can be performed because mechanical motions of the deflection yokes are not necessary.

It is an object of the invention, therefore, to provide a generator for fast electronic control of size, shape, and position of a television raster as a function of external signals.

Another object of the invention is to provide a controllable television raster generator having high linearity of the controllable deflection waveforms which produce the raster changes.

A further object of the invention is to provide a television raster generator for producing all combinations of the different raster changes with simplicity and high speed.

Other objects and many of the attendant advantages of this invention will become readily appreciated as the same becomes better understood by reference to the following detailed description when considered in connection with the accompanying drawings wherein.

Figure 1:
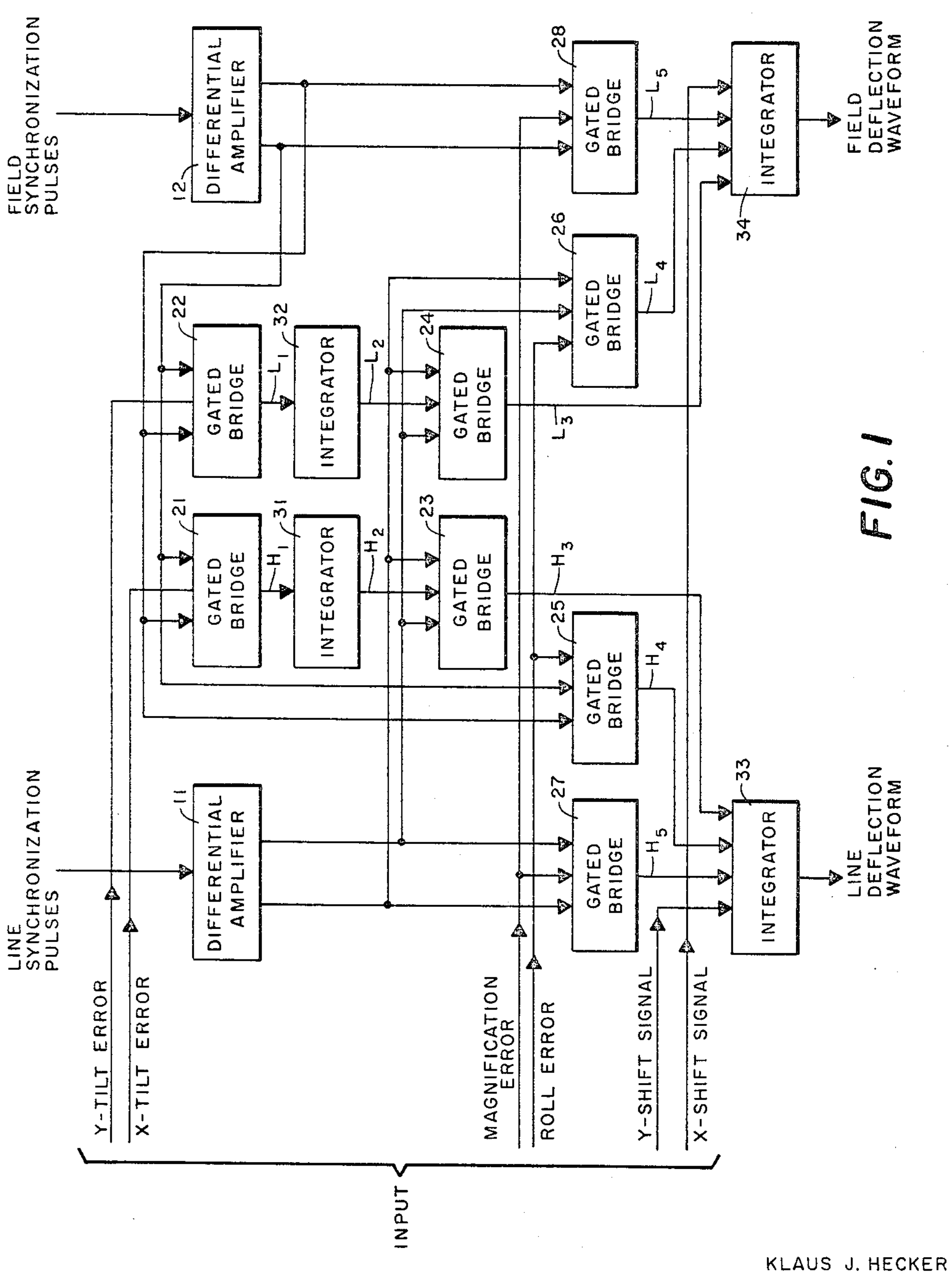
FIG. 1 is a block diagram of a television storage tube deflection generator of the instant invention.

FIG. 1 is a block diagram of the controllable television raster generator, which is used as a deflection generator, and which includes a channel for the line deflection waveform and a channel for the field deflection waveform. The line synchronization and field synchronization pulses from the master synchronization generator (not shown) are fed to differential amplifiers 10 and 12, respectively, which produce both amplified forms of the respective synchronization pulses and amplified inverted forms of the same pulses. These sets of complementary pulses are delivered to the eight gated bridge circuits 21–28 of the subsequent circuitry as indicated in FIG. 1.

A gated bridge circuit is essentially a bipolar gate which does not produce a pedestal. That is, when no gating pulses are received, the gated bridge circuit produces an output of zero voltage; but when the bridge is opened by the gating pulses, it produces either a positive or a negative output pulse of the same amplitude as the input signal. The pulses produced by differential amplifiers 11 and 12 constitute the gate pulses for the gated bridge circuits 21–28 (each circuit receives both a gate pulse and its inverse). Four integrators 31–34 are used to produce sawtooth waveforms from pulse waveforms. Since pulse waveforms can easily be changed in amplitude, the integrators represent a simple means of providing an output sawtooth waveform which varies in proportion to the input amplitude.

The operation of the deflection generator may be understood by reference to FIGS. 2–8, which show the effects of the error signals upon the deflection waveforms and consequently upon the raster. The waveform designations in these figures ($H_1$, $H_2$, $H_3$, $H_4$, $H_5$; $L_1$, $L_2$, $L_3$, $L_4$, $L_5$) correspond to those which appear in FIG. 1 at the points in the deflection generator where these waveforms occur. For the purpose of this description, only one error signal is assumed to be present at any time, though in actuality the different error signals will occur simultaneously and may produce rasters of irregular shape.

Figure 2:
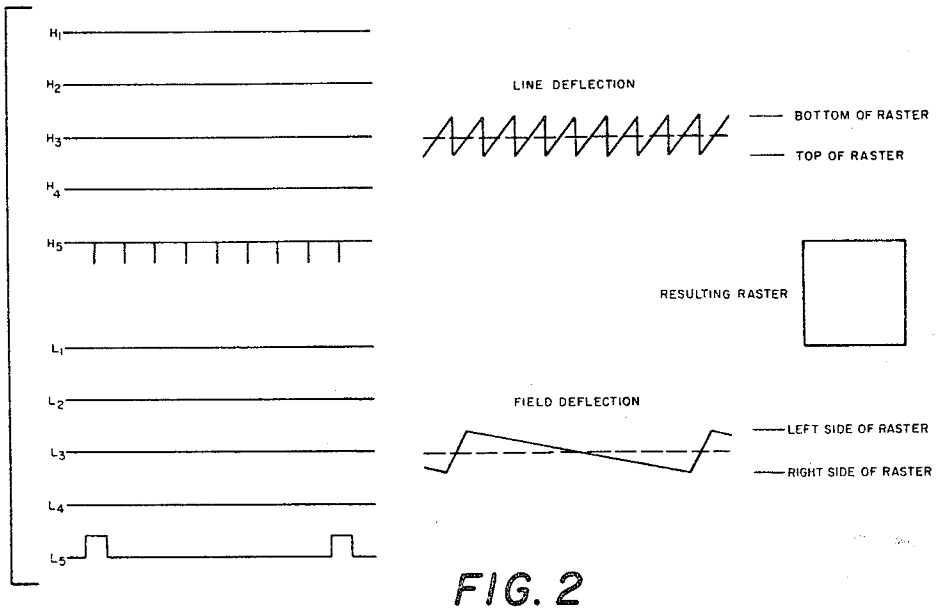
FIG. 2 shows deflection generator waveforms; initial condition.

FIG. 2 shows the waveforms in the initial condition. In this condition, all error signals are zero, and integrators 31–34 are discharged so that there are no DC components at their outputs. As a result, output pulses are produced by none of the gated bridge circuits except 27 and 28 which produce signals $H_5$ and $L_5$ respectively. These two circuits 27 and 28 are biased in such a way that they produce output pulses even when their input error signal (the magnification error signal) is zero. Consequently, line synchronization pulses of a certain amplitude are present at $H_5$ and field synchronization pulses of the same amplitude are present at $L_5$. Because these signals are the only input signals to the line deflection integrator 33 and the field deflection integrator 34, the output of line deflection integrator 33 is simply a sawtooth at line frequency while that of field deflection integrator 34 is a sawtooth at field frequency. These two signals produce a normal raster, as indicated in FIG. 2.

Figure 3:
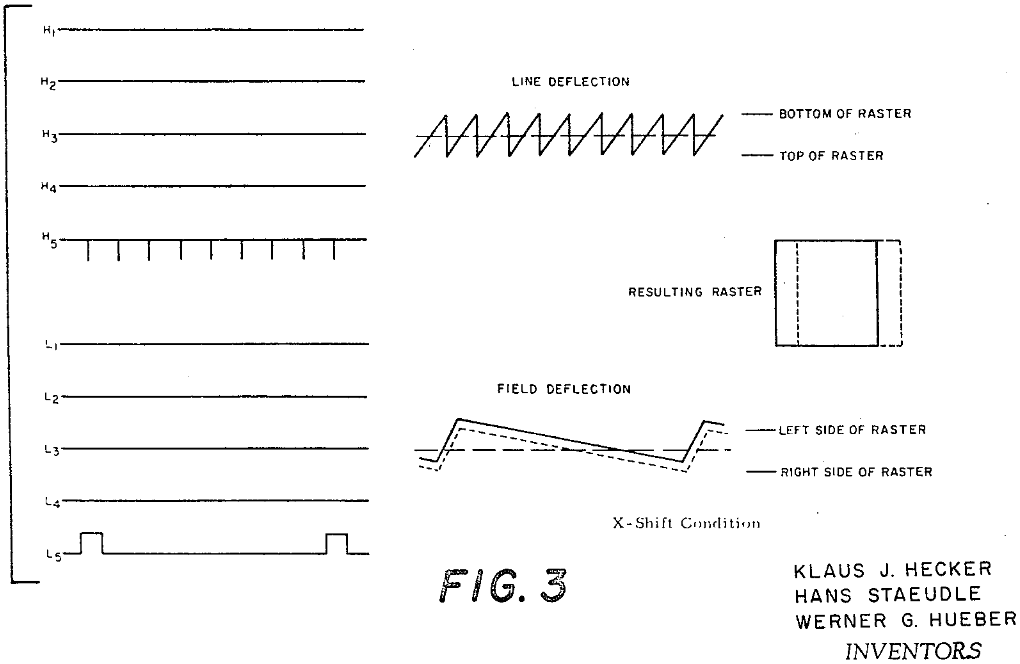
FIG. 3 shows deflection generator waveforms during X-shift condition; the normal deflection waveforms and raster shown in dashed lines.
Figure 4:
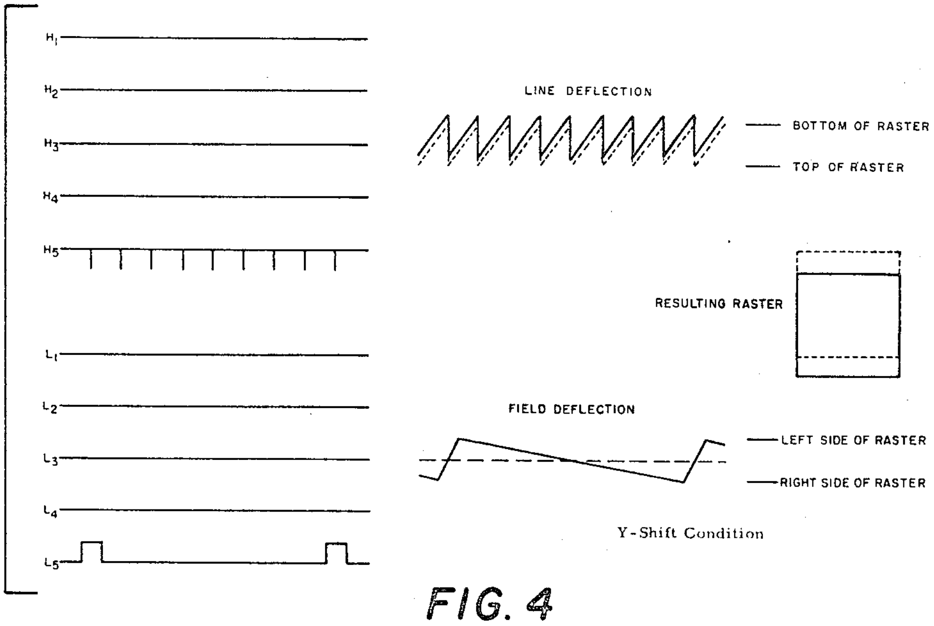
FIG. 4 shows deflection generator waveforms during Y-shift condition; the normal deflection waveforms and raster shown in dashed lines.

FIG. 3 shows the effect of an X-shift signal upon the deflection waveforms and the raster. When the X-shift signal is received, it is integrated in field deflection integrator 34 and produces a DC bias on the field deflection sawtooth, thus causing the raster to be shifted sideways to the right or left depending on the polarity of the error signal. FIG. 4 shows the similar effect of a Y-shift signal, which, when integrated in line deflection integrator 33, causes the line deflection sawtooth to be shifted in the positive or negative direction (depending on the polarity of the error signal), which in turn causes the raster to be shifted either up or down.

Figure 5:
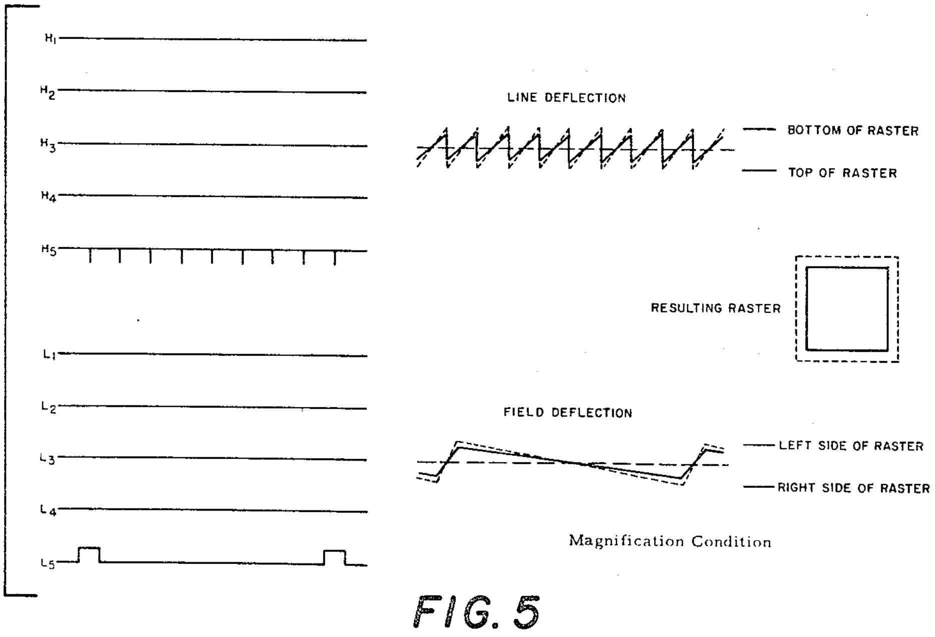
FIG. 5 shows deflection generator waveforms during magnification condition; the normal deflection waveforms and raster shown in dashed lines.

FIG. 5 shows the effect of a magnification error signal upon the deflection waveforms and the raster. In this case, gated bridges 27 and 28 which provide waveforms $H_5$ and $L_5$ respectively will supply pulses of an amplitude different from those supplied in the initial condition. These pulses will cause both the line deflection and field deflection sawtooths to differ in amplitude from the initial sawtooths, resulting in a raster that is either smaller or larger than the original raster.

Figure 6:
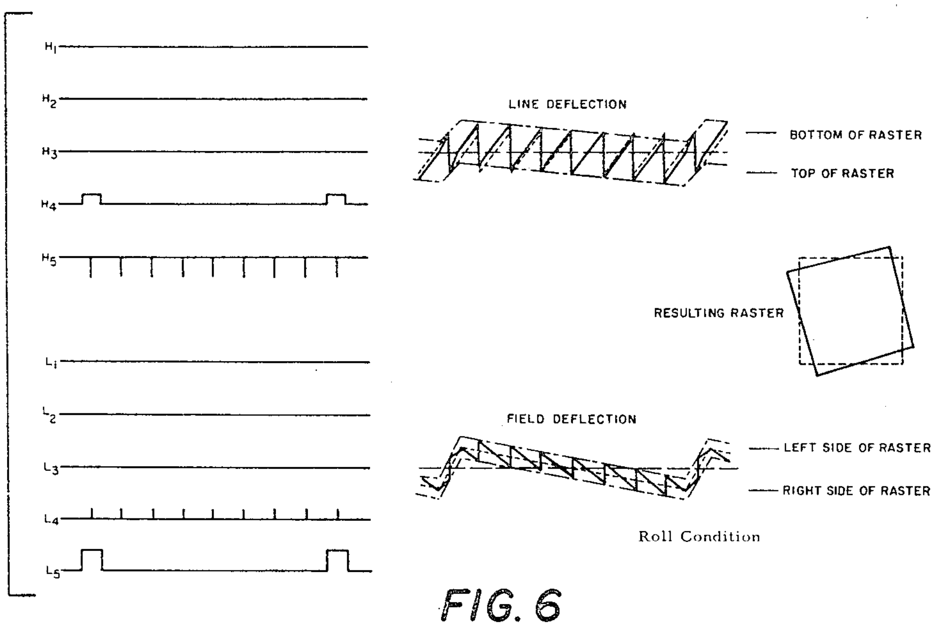
FIG. 6 shows deflection generator waveforms during roll conditions; the normal deflection waveforms and raster shown in dashed lines.

FIG. 6 shows the effect of a roll error signal upon the deflection waveforms and the raster. This effect results from the action of gated bridge circuits 25 and 26 that produce signals $H_4$ and $L_4$ respectively. The first of these circuits, 25, which is in the line deflection channel is gated by the field synchronization pulses, and the second, 26, which is in the field deflection channel, is gated by the line synchronization pulses. If the roll error signal deviates from zero, the pulses fed into the two deflection integrators 33 and 34 will result in output waveforms which are mixtures of line and field frequencies, as indicated in FIG. 6. As a result, the raster will be rotated about its center point in the manner shown.

Figure 7:
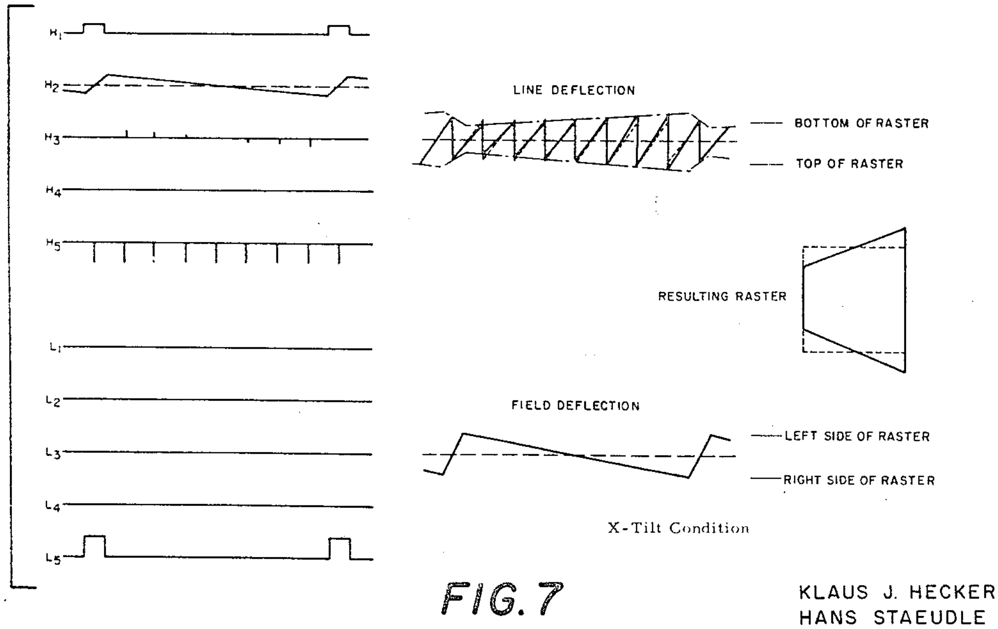
FIG. 7 shows deflection generator waveforms during X-tilt condition; the normal deflection waveforms and raster shown in dashed lines.
Figure 8:
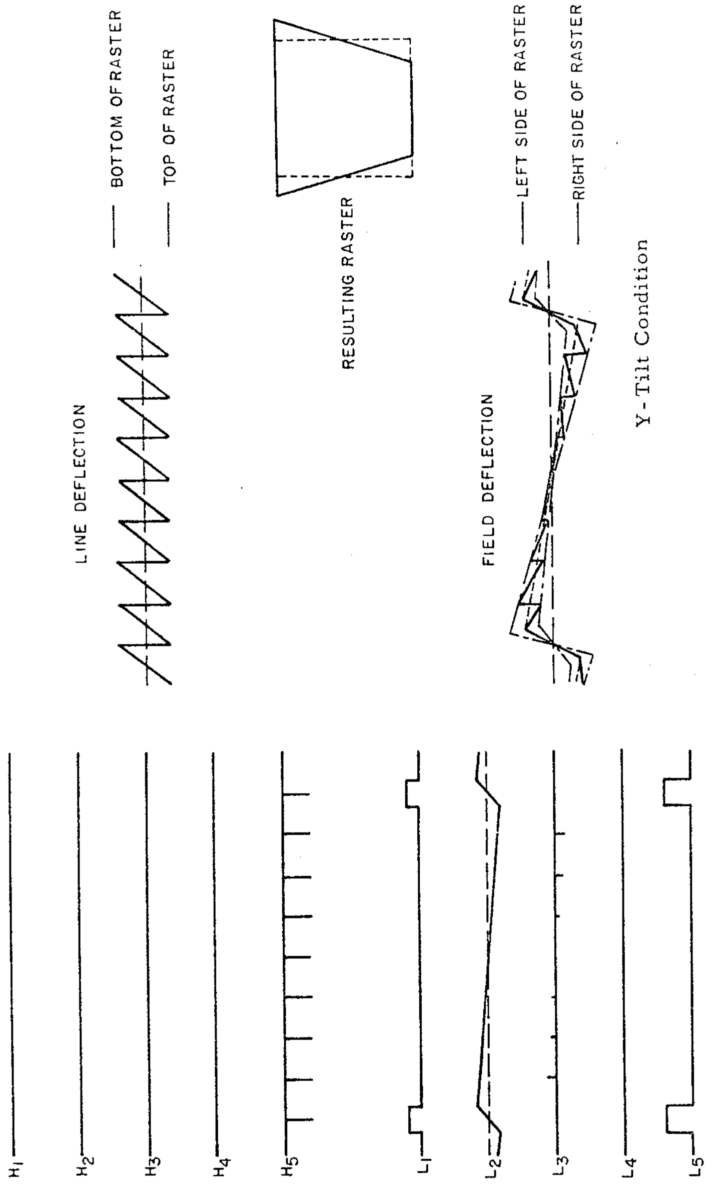
FIG. 8 shows deflection generator waveforms during Y-tilt condition; the normal condition waveforms and raster shown in dashed lines.

FIGS. 7 and 8 show the effects of X-tilt and Y-tilt error signals upon the deflection waveforms and the raster. These effects are more complicated than those of any of the other error signals. When an X-tilt error signal is received, the gated bridge circuit 21 that produces waveform $H_1$ produces field synchronization pulses of an amplitude corresponding to that of the error signal. This signal is integrated in integrator 31 which produces a sawtooth waveform of field frequency ($H_2$), and this sawtooth is fed to a bridge circuit 23 which is gated by line synchronization pulses. The output $H_3$ of bridge circuit 23 thus consists of positive and negative line synchronization pulses whose amplitudes vary depending upon their positions within each field. This signal is integrated in line deflection integrator 33 with the normal line deflection waveform $H_5$, thus producing the line deflection waveform required to produce a raster of the shape indicated in FIG. 7. The effect of the Y-tilt error signal, which is handled in a similar manner, is shown in FIG. 8, but via circuits 22, 32, 24, and 34.

The "Simplified Analysis" set forth in the aforementioned Patent No. 3,315,032 describes various signal situations that correspond to the various rasters shown in FIGS. 2–8.

The generator described herein can also be used to control a different number of items as a function of external signals. The X and Y components of the magnification and roll error signal may be applied separately to the gated bridges. Further, the instant generator can be used to generate any other special purpose raster, e.g., a a triangular raster.

Obviously many modifications and variations of the present invention are possible in the light of the above teachings. It is therefore to be understood that within the scope of the appended claims the invention may be practiced otherwise than as specifically described.

What is claimed is:

1. A deflection generator system for providing fast electronic control of size, shape and position of a television raster as a function of external signals, comprising:

(a) a line deflection waveform channel and a field deflection waveform channel, (b) a line channel differential amplifier and a field channel differential amplifier to which line synchronization pulses and field synchronization pulses are fed respectively, each of said differential amplifiers producing amplified forms of the respective synchronization pulses applied thereto and also inverted forms thereof, (c) first, second, third and fourth line channel gated bridge circuits, and first, second, third and fourth field channel gated bridge circuits, (d) the output of said line channel differential amplifier being fed to said second and fourth line channel gated circuits and said second and third field channel gated circuits, (e) the output of said field channel differential amplifier being fed to said first and fourth field channel gated circuits and said first and third line channel gated circuits, (f) first and second line channel integrators, and first and second field channel integrators which produce sawtooth waveforms from pulse waveforms fed thereto, (g) the output of said first line channel gated circuit being fed to said first line channel integrator, and the output of said first field channel gated circuit being fed to said first field channel integrator, the outputs of said first integrators in turn being fed to said second gated bridge circuits of said line and field channels respectively, (h) means for applying a first external signal to said first line channel gated bridge circuit, a second external signal to said first field channel gated bridge circuit, a third external signal to said third line channel and field channel gated bridge circuits, a fourth external signal to said fourth line channel and field channel gated bridge circuits, a fifth external signal to said second line channel integrator, and a sixth external signal to said second field channel integrator circuit, (i) the outputs of said second, third, and fourth line channel gated bridge circuits being fed to said second line channel integrator, and the outputs of said second, third, and fourth field channel gated bridge circuits being fed to said second field channel integrator, (j) the output of said second line channel and field channel integrators being the line deflection and field deflection waveforms respectively, (k) said fourth line channel and field channel gated bridge circuits being biased to produce output pulses corresponding to said line and said field synchronization pulses respectively even when the said fourth external signal is zero, for causing a normal raster to be produced when no external signals are present, whereby all possible combinations of raster size, shape, and position can be generated with high linearity of the deflection waveforms.

2. A device as in claim 1 wherein each of said gated bridge circuits is essentially a bipolar gate which produces an output of zero voltage when no gating pulses are received, and produces an output pulse of either polarity and of the same amplitude as the input signal when the bridge is opened by gating pulses.

3. A device as in claim 1 wherein said first, second, third, fourth, fifth, and sixth external signals are X-tilt error, Y-tilt error, roll error, magnification error, Y-shift and X-shift signals respectively.

4. A device as in claim 3 wherein the X and Y components of the magnification error signal applied to said fourth line channel and field channel gated bridge circuits are applied separately to said fourth gated bridge circuits respectively, and the X and Y components of the roll error signal applied to said third line channel and field channel gated bridge circuits are applied separately to said third gated bridge circuits respectively.

References Cited

UNITED STATES PATENTS 2,586,521 2/1952 Czeropski et al. ------- 315—27

ROBERT L. GRIFFIN, *Primary Examiner.*

R. K. ECKERT, Jr., *Assistant Examiner.*